UNITED STATES PATENT OFFICE.

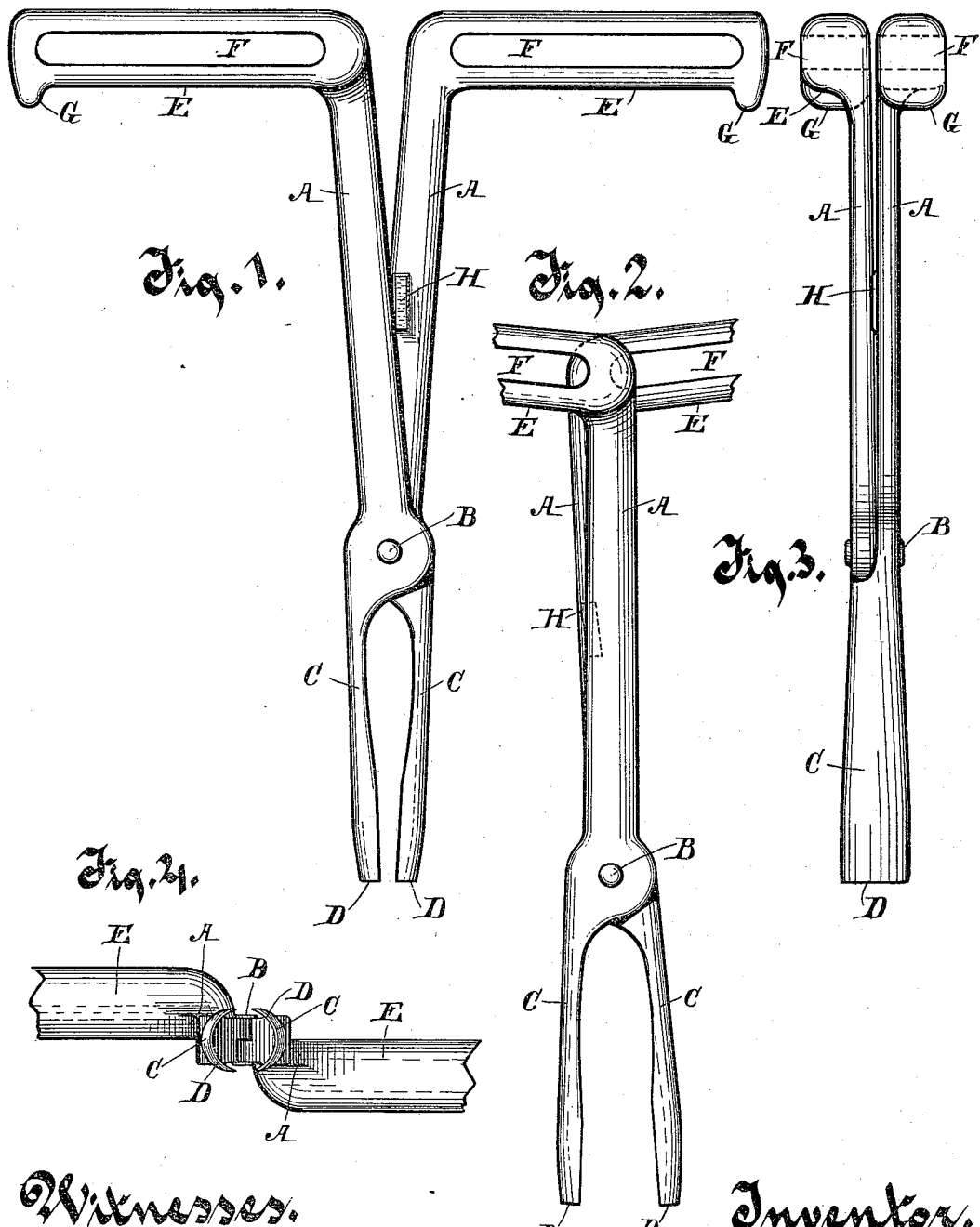

WILLIAM H. VOGEL, OF MILWAUKEE, WISCONSIN.

DANDELION DIGGER AND PULLER.

SPECIFICATION forming part of Letters Patent No. 437,466, dated September 30, 1890.

Application filed March 24, 1890. Serial No. 345,097. (No model.)

*To all whom it may concern:*

Be it known that I, WILLIAM H. VOGEL, of Milwaukee, in the county of Milwaukee and State of Wisconsin, have invented a new and useful Dandelion Digger and Puller; and I do hereby declare the following to be a full, clear, and exact description of said invention, reference being had to the accompanying drawings, and to the letters of reference marked thereon, which form a part of this specification.

The object of my invention is to provide a device adapted to dig about and pull the root of a dandelion from the ground. The device is constructed to enter the ground on two sides and partly around the main root of the dandelion, and by compression of the tool against the root and surrounding earth within the tool to so grasp the root that it may be pulled from the ground by raising the tool.

In the drawings, Figure 1 is a side view of my improved device shown in the position it has when drawing the dandelion from the ground. Fig. 2 is another side view of the device shown with the spades or jaws thrown farther apart. Fig. 3 is an edge view of the device. Fig. 4 is a view of the device from its lower end, parts being omitted in Figs. 2 and 4 for convenience of illustration.

The device consists of two tong-like irons A A, pivoted together medially at B. The irons below the pivoted point B are constructed in the form of two long straight jaws or spades C C, curved inwardly at their edges in cross-section and terminating in sharp laterally-curved edges D D. At the upper ends the irons A A terminate in laterally-extending handles E E. These handles are preferably cast hollow or with a slot F to save material and make the device lighter to manipulate, and are preferably provided with a guard G to keep the hand from slipping off the end of the handle. A knob or bearing H is located on the inside of one of the arms A and is intended to serve merely as a check-bearing to receive the principal thrust of the other iron as it is swung inwardly toward the iron having the bearing, and check the movement of the irons toward each other, though the knob does not project sufficiently far to stop the irons from passing each other.

When this device is used, the handles should be swung toward each other until the spades or jaws C C are about parallel to each other, when the jaws are pushed into the ground one on each side of the main or tap root of the dandelion, being partly about the root by reason of the curved form of the spades, and when the spades are sufficiently far in the ground the handles may be forced apart slightly, throwing the lower ends of the spades inwardly toward each other in the manner shown in Fig. 1, thereby pressing the earth between them firmly against the dandelion-root, so as to hold it with sufficient power that the root may be pulled from the ground by lifting the tool. When the tool and its load have been raised from the ground, the handles may be thrown together and partially past each other in the form shown in Fig. 2, thereby opening the jaws C C sufficiently to allow the earth and root to fall from the tool.

What I claim as new, and desire to secure by Letters Patent, is—

A dandelion digger and puller consisting of two irons pivoted together medially, their lower ends being long straight spades curved toward each other at the edges in cross-section, their upper ends being provided with laterally-extending handles integral with the spades, which handles are arranged to partially pass each other, and a knob H, located on the inside of one of the arms and constructed to receive the thrust of the other arm of the device as the two parts are swung toward each other and to partially check the motion of the arms toward each other, substantially as described.

In testimony whereof I affix my signature in presence of two witnesses.

WILLIAM H. VOGEL.

Witnesses:
C. T. BENEDICT,
C. H. KEENEY.